United States Patent
Liu et al.

(10) Patent No.: US 9,430,037 B2
(45) Date of Patent: *Aug. 30, 2016

(54) SYSTEM LOCALE NAME MANAGEMENT (71) Applicant: International Business Machines Corporation, Armonk, NY (US)

(72) Inventors: Su Liu, Round Rock, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/074,890

(22) Filed: Nov. 8, 2013

(65) Prior Publication Data
US 2015/0089375 A1 Mar. 26, 2015

Related U.S. Application Data (63) Continuation of application No. 14/034,646, filed on Sep. 24, 2013.

(51) Int. Cl.
*G06F 17/30* (2006.01)
*G06F 3/01* (2006.01)
*H04L 12/26* (2006.01)

(52) U.S. Cl.
CPC .............. *G06F 3/01* (2013.01); *H04L 43/50* (2013.01)

(58) Field of Classification Search
USPC .................. 707/760, 761, 763, 802; 715/736
See application file for complete search history.

(56) References Cited

U.S. PATENT DOCUMENTS

| 5,687,366 | A | 11/1997 | Harvey, III et al. |
| 5,812,964 | A * | 9/1998 | Finger ................. G06F 17/3056 704/7 |
| 5,835,768 | A | 11/1998 | Miller et al. |
| 5,900,871 | A | 5/1999 | Atkin et al. |
| 6,701,428 | B1 | 3/2004 | Harvey, III et al. |
| 7,194,506 | B1 * | 3/2007 | White ............... G06F 17/30902 709/203 |
| 7,627,858 | B2 | 12/2009 | Rose et al. |
| 7,676,486 | B1 * | 3/2010 | Tulkoff ................. G06F 17/303 707/999.102 |

(Continued)

FOREIGN PATENT DOCUMENTS

WO    WO 03/036544 A2    5/2003

OTHER PUBLICATIONS

U.S. Appl. No. 14/034,646, 1 page.

(Continued)

*Primary Examiner* — Hanh Thai
(74) *Attorney, Agent, or Firm* — Stephen J. Walder, Jr.; Thomas E. Tyson (57) ABSTRACT

Mechanisms are provided for performing a locale name modification operation. The mechanisms receive, via a locale name management user interface presented by the data processing system, a new locale name to be used by the data processing system to perform locale customized operations. The mechanisms identify an existing locale name to be replaced by the new locale name. The mechanisms map the new locale name to existing locale name data structures associated with the existing locale name to be replaced and verify proper operation of a software element using the new locale name and the mapping of the new locale name to the existing locale name data structures. The mechanisms utilize the new locale name to perform locale name customized operations in response to verifying proper operation of the software element.

10 Claims, 5 Drawing Sheets

(56) References Cited

U.S. PATENT DOCUMENTS

| | | |
|---|---|---|
| 7,818,282 B2 | 10/2010 | Blackwell et al. |
| 8,010,530 B2 | 8/2011 | Potter |
| 9,141,352 B2 | 9/2015 | Bromley, Jr. et al. |
| 2003/0079051 A1 | 4/2003 | Moses et al. |
| 2005/0154701 A1* | 7/2005 | Parunak ............ G06F 17/30734 |
| 2006/0004738 A1* | 1/2006 | Blackwell ............. G06F 9/4448 |
| 2006/0047499 A1 | 3/2006 | Chen et al. |
| 2006/0047710 A1 | 3/2006 | Hu et al. |
| 2006/0265207 A1 | 11/2006 | Gutz et al. |
| 2007/0100597 A1 | 5/2007 | Jacquot |
| 2008/0076400 A1 | 3/2008 | Moosavi et al. |
| 2010/0100369 A1 | 4/2010 | Shetty et al. |
| 2011/0099489 A1 | 4/2011 | Glenn et al. |
| 2011/0196756 A1 | 8/2011 | Moosavi et al. |
| 2012/0109998 A1 | 5/2012 | Patch et al. |
| 2013/0174027 A1 | 7/2013 | Atkin et al. |

OTHER PUBLICATIONS

"Bug 380287—Change Locale name from "pa-IN" to pa", https://bugzilla.mozilla.org/show_bug.cgi?id=380287, accessed on Jun. 25, 2013, 8 pages.

IBM, et al., "Design to Enable Locale Tagging for the Database Manager", An IP.com Prior Art Database Technical Disclosure, http://ip.com/IPCOM/000110797, Mar. 26, 2005, 11 pages.

IBM, "Language Independent Interface for Retrieving Language and Culture Information Elements, Including Calendar and Weekday Settings, From a Locale", An IP.com Prior Art Database Technical Disclosure, http://ip.com/IPCOM/000014981, Jun. 20, 2003, 4 pages.

IBM, et al., "Language Independent Interfaces for Locale Management Services", An IP.com Prior Art Database Technical Disclosure, http://ip.com/IPCOM/000116922, Mar. 31, 2005, 3 pages.

International Search Report and Written Opinion dated Dec. 24, 2014 for International Application No. PCT/CN2014/087167, 11 pages.

* cited by examiner

SYSTEM LOCALE NAME MANAGEMENT

This application is a continuation of application Ser. No. 14/034,646, filed Sep. 24, 2013, status pending.

BACKGROUND

The present application relates generally to an improved data processing apparatus and method and more specifically to mechanisms for managing system locale names so as to keep globalization support coherence.

Locale names are used by multicultural operating systems and applications to perform a number of operations that provide cultural conventions, geographical customization, and/or special variant preferences for a particular locale, where the "locale" is a certain set of rules and parameters of cultural conventions with certain script and geographical location with which a user affiliates oneself. The locale defines the user's language, script, region, and any special variant preferences that the user wants to user in their computing environment. That is, the locale may not necessarily be the actual physical location of the user, but is a culture convention correlated geographical location with which the user associates oneself, e.g., a user of Chinese descent working in the United States may still utilize the locale of China even though the user is physically located in the United States. The locale may be specified at various levels of language, script, geographical detail including region, territory, or the like.

Based on different locales, multicultural operating systems may process data in different ways. For example, locales are used to determine how to process communication data, e.g., determining in which language to output a communication. Other examples include determining a keyboard input mapping, determining currency conventions and input/output, determining date/time format, numeric representations, and the like.

SUMMARY

In one illustrative embodiment, a method, in a data processing system comprising a processor and a memory, for performing a locale name modification operation. The method comprises receiving, in the data processing system, via a locale name management user interface presented by the data processing system, a new locale name to be used by the data processing system to perform locale customized operations. The method further comprises identifying, by the data processing system, an existing locale name to be replaced by the new locale name. Moreover, the method comprises mapping, by the data processing system, the new locale name to existing locale name data structures associated with the existing locale name to be replaced. In addition, the method comprises verifying, by the data processing system, proper operation of a software element using the new locale name and the mapping of the new locale name to the existing locale name data structures. The method also comprises utilizing, by the data processing system, the new locale name to perform locale name customized operations in response to verifying proper operation of the software element.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As mentioned previously, multicultural operating systems and applications make use of locales to determine the manner by which they perform processing on data, both with regard to inputs and outputs. The locale used by a multicultural operating system is typically represented as an object file that is used to identify a set of cultural conventions. These cultural conventions include information on collation, character classification, date/time format, monetary symbols, and numeric representations, for example. In a multicultural operating system, a set of locale variables, e.g., LC_* (see examples below), can be used to specify a user preferred language and culture environment. A multicultural application environment may be initialized, for example, by the Application Programming Interface (API), such as the setlocale( ) API, to load the defined locale object from a specified path, e.g., $LOCPATH. In one example, this specified path may be set to a default of "/usr/lib/nls/loc/" in the Advanced Interactive Executive (AIX®) operating system available from International Business Machines Corporation of Armonk, N.Y.

Examples of normal UNIX global locale environment variables include the following:

LC_ALL: for all of the locale.

LC_COLLATE: for regular expression matching (determines the meaning of range expressions and equivalence classes) and string collation.

LC_CTYPE: for regular expression matching, character classification and conversion, case-sensitive comparison, and wide character functions.

LC_MESSAGE: for localizable natural-language messages

LC_MONETARY: for monetary formatting.

LC_NUMERIC: for number formatting (such as the decimal point and the thousands separator).

LC_TIME: for time and date formatting.

Generally, in modern multicultural operating system environments, there are approximately 30 locale name related environment profiles and component directories (font, keyboard, desktop, translation, etc.) for each locale object, and there are generally hundreds of locales, e.g., more than 800 locales (locale aliases) in AIX®. Applications need to receive correct locale name information to find translated catalog path, keyboard mapping, input method profile, layout engine, desktop configuration, and other locale based information in order to properly perform their operations. Any mismatched pair of locale name and local object will cause problems with usability, capability, reliability, scalability, or compatibility of the application and the operating system.

The loading of the correct locale object and passing of a correct locale name to applications are critical to supporting multicultural, or globalization, features in modern multicultural or globalized operating systems. By "globalization" or "globalized" operating systems, what is meant is that in modern large scale enterprise systems, often times users associated with the enterprise are present in multiple different geographical locations of the enterprise, or associate themselves with different geographical locations. Thus, certain users of the enterprise may associate themselves with a first locale, e.g., China, while another set of users may associate themselves with a second locale, e.g., the United States of America. As such, various users of the same enterprise may use different locales and operating systems and applications used within the enterprise must accommodate these different locales.

The locale object data structure is defined in multiple different levels. A locale name object may include "language" level information, "script" level information, "territory/regional" level information, and "code page" information, each level of information being specified by sub-tags within a locale name. For example, a UNIX locale name format is of the type "ll_[Ssss_]RR[.CCCC][@MODIFIERS]", where the sub-tag "ll" represents language, "Ssss" represents script if it is needed, "RR" represents region or territory (for instance, Cyrl in "sr-Cyrl-RS.UTF-8" means that Cyrillic script is used in Serbian language in Serbia; Latn in "sr_Latn_RS.UTF-8" means that Latn script is used in Serbian language in Serbia), the sub-tag ".CCCC" represents code page name (for instance, UTF-8 is a Unicode encoding scheme used in "sr-Cyrl-RS.UTF-8" locale), and the sub-tag "@MODIFIERS" represents extra culture flags that may need to added based on the implementation, such as @euro and @preeuro for those countries preparing to or that have joined the Eurozone (for instance, FR_FR.UTF-8@preeuro locale is available for anyone that needs to use Franc instead of Euro as French currency). This locale name format is typically used in modern operating systems, such as AIX®, Solaris®, HP_UX®, and LINUX®.

Figure 1:
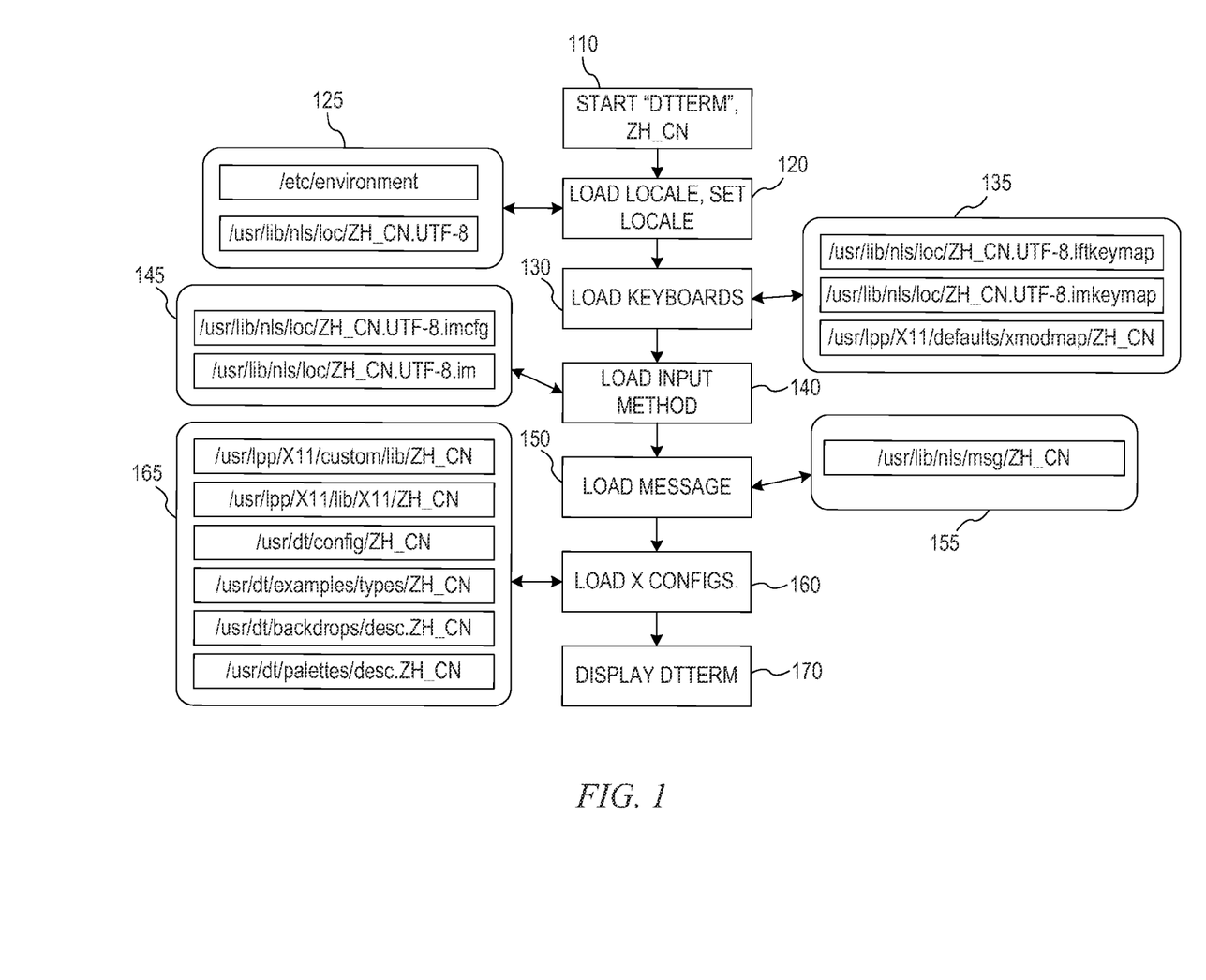
FIG. 1 illustrates the importance of passing the correct locale name and locale object to applications.

FIG. 1 illustrates the importance of passing the correct locale name and locale object to applications. As shown in FIG. 1, in order to provide a simple terminal interface, dtterm, for a user to enter commands, multiple locale based objects must be loaded. For example, as shown in FIG. 1, when the dtterm interface is invoked, the locale name ZH_CN is passed to the dtterm application (step 110). The locale object is loaded and the locale is set (step 120). This operation requires the accessing of the environment objects corresponding to the locale name ZH_CN 125. Thereafter, the corresponding keyboard is loaded (step 130) using the keyboard objects 135 corresponding to the locale name.

The input method is loaded (step 140) using the input method configuration objects 145. Message parameters are loaded (step 150) using the message locale object 155. The X window configurations are obtained (step 160) using the locale X window configuration objects 165. Thereafter, the dtterm interface may be displayed in a manner customized to the specific locale passed to the dtterm application.

Thus, in order to provide a dtterm terminal interface, multiple locale based configuration objects/files must be loaded and checked. If the locale name passed to the dtterm application is incorrect, the correct configuration objects/files may not be able to be loaded and proper functioning of the dtterm interface may be impeded.

Such mismatches between locale name and locale objects may occur under various circumstances. That is, the locale name for the same language, script, region, and the like, may change fairly often due to political and/or technical reasons. Thus, for example, a locale name that is supported by a globalized operating system may simply no longer exist due to the corresponding country, region, language, or the like being absorbed into a larger entity, being called by a different name, or the like. For example, Czechoslovakia is now broken into the Czech Republic and Slovakia. As a result, a locale name associated with Czechoslovakia may need to be changed to a new locale name associated with the Czech Republic. In addition, another new locale name corresponding to Slovakia may need to be created and associated with corresponding locale object(s).

As further examples, for various technical reasons, the locale name may be changed to better suit the operating system implementation. Sometimes such changes may be as simple as changing capitalization of letters in the locale name, changing extensions in the locale name, or the like. For whatever the reason may be for the change in locale name, the result is that multicultural or globalized operating systems and applications must be able to recognize all of the various versions of the locale name in order to ensure that users using antiquated or out of date locale names are still provided locale specific functionality of the operating systems or applications.

As an example, within the past few years, the Serbian Cyrillic Locale name for some operating systems has changed five times: sr-YU.UTF-8 changed to sr-RS.UTF-8, which changed to sr-CS.UTF-8, which changed to sr-Cyrl-CS.UTF-8, which finally changed to sr-Cyrl-RS.UTF-8. Thus, a Serbian Cyrillic locale enabled Cluster Systems Management (CSM) application would have to recognize five different locale names in order to provide Serbian locale service properly.

As yet another example, according to ISO 639-1, the Language Code of Hebrew/Israel has been changed from "iw" to "he." Therefore, it becomes necessary to change the old Hebrew locale name iw_IL.UTF-8 to the new locale name he_ILUTF-8. As an example of a globalized application, a Hebrew/Israel locale enabled storage server would have to recognize two different locale names in order to provide Hebrew locale service properly for all applications, i.e. both iw_ILUTF-8 and he_IL.UTF-8, such that users using the old locale name are provided proper service as well as the users using the new locale name.

Thus, due to the relatively frequent change in locale names, operating systems and applications must support many different versions of these locale names. Add to this, the fact that such applications or operating systems must support many hundreds of such locales, this causes a large number of locales and versions of locales to be supported by the operating system and applications.

Not only do such locale name issues and inconsistencies between locale names add risks associated with the usability, capabilities, reliability, scalability, compatibility, availability, and the like, of globalized operating systems and applications, but such inconsistencies in locale names may become a major factor in the cause of bit-rot (also known as bit decay, data rot, or data decay), i.e. the gradual decay of storage media or a software program over time due to non-use of the data. That is, because of locale name changes, an updated operating system or application may not access or process portions of digitized information contents which were saved prior to the update of the operating system/application, leading to bit-rot.

The illustrative embodiments provide mechanisms for managing system locale names so as to keep globalization support coherence. The illustrative embodiments simplify locale name configuration automatically at multiple layers, such as input method, keyboard mapping, desktop, translated message catalog, etc. In addition, the illustrative embodiments also verify locale name coherence for newly added/configured locale names of applications and triggering a self-restore function, or undo process, in the event that coherence verification fails.

The illustrative embodiments provide a locale name management user interface for managing locales. With the locale name management user interface, the user can:

(1) submit a new locale name change requirement;
(2) obtain a new locale name, retrieve all related profiles (e.g., user profiles, system profiles, application profiles, etc.);
(3) list all installed related locales;
(4) obtain all translated message catalog files (e.g. *.cat files in UNIX) installed in the system for different languages/locales;
(5) update/generate locale name testcases based on the new locale name;
(6) layout topology of locale dependency relation for locale name management;
(7) create locale object name mapping, links, or locale alias table data structure based on the new topology;
(8) map and/or replace locale names with new locale name;
(9) update all related profiles (e.g., user profiles, system profiles, application profiles, etc.);
(10) test/verify the new configured locale name; and
(11) remove the new locale name and restore an old locale name in response to the new locale name not passing verification testing.

For example, when a user wishes to deploy a new locale name into a globalized environment, e.g., across a plurality of computing devices either through a centralized mechanism or through distribution to the plurality of computing devices for local implementation, the user may start the locale name configuration engine utilizing the locale name management interface. The user may enter a new locale name via the locale name management user interface and indicate either an old locale name to replace with the new locale name or utilize an attribute of the new locale name, e.g., a sub-tag, a specification by the user of the geographical area represented by the locale name, etc., to automatically identify an old locale name that may be replaced by the new locale name. In identifying old locale names automatically, the currently used locale names may be retrieved, such as from user profiles, system profiles, and application profiles specifying the locale names supported by each of these levels of software, and an automatic identification based on similarity of attribute may be performed. Based on the identified old locale name to be replaced, identified either directly by the user or automatically based on an attribute of the new locale name, a report of the related and installed locales corresponding to the new locale may be presented via the locale name management user interface, through which the user may select which locale name(s) the user wishes to replace with the new locale name.

Based on the selection of which related installed locale name(s) to replace with the new locale name, the locale name configuration engine may further track, analyze, and identify independent software vendor (ISV) applications that utilize the old locale name that may require manual reconfiguration after the update to the new locale name. These ISV applications may be identified in an output of the locale name management user interface so that the user is informed of additional manual configuration operations the user should consider performing.

The ISV applications themselves may be identified by the locale name management mechanisms of the illustrative embodiments in any suitable manner for the particular implementation. Currently, there are three possible ways to identify these ISV applications, but the present invention is not limited to any one or all of these three ways but may encompass other mechanisms and methods of identifying ISV applications that will become readily apparent to those of ordinary skill in the art in view of the present description. Currently, one may identify ISV applications by checking default and standard locations, using a system installation tool, or searching locale names in a given ISV directory.

For example, with regard to checking default and standard locations, each operating system platform has a guideline for ISV applications and users which can be used to identify these default or standard locations. In UNIX, for example, /usr/lib/nls/msg/zh_CN is a default for any ISV applications. In the /etc/environment, the operating system also provides "NLSPATH": NLSPATH=/usr/lib/nls/msg/% L/% N. ISV installation scripts install any zh_CN related messages into /usr/lib/nls/msg/zh_CN, or add extra path into "NLSPATH". So checking "NLSPATH" can be a typical way to allocate the ISV's profile or messages.

With regard to using a system installation tool, tracking or logging files of system installation management tools can be used to find locale names and related directories. For instance, "lslpp -f xlC.msg.zh_CN.cpp" can explicitly show the C++ compiler's Chinese message location: /usr/lib/nls/msg/zh_CN/xlCfe.cat.

In addition, with regard to searching locale names in a given directory, real time file/fold searching methods can be used to find zh_CN related directories and files:

/usr/dt/app-defaults/zh_CN
/usr/dt/appconfig/help/zh_CN
/usr/dt/appconfig/types/zh_CN -continued /usr/dt/config/psfonts/zh_CN
/usr/dt/config/zh_CN
/usr/dt/examples/types/zh_CN
/usr/dt/lib/nls/msg/zh_CN
/usr/idebug/engine/msg/zh_CN
/usr/idebug/plugins/com.ibm.lpex.doc.user.nl1_3.1.0/nl/zh_CN
/usr/idebug/plugins/com.ibm.lpex.nl1_3.1.0/nl/zh_CN
/usr/lib/nls/loc/zh_CN
/usr/lib/nls/msg/zh_CN
/usr/lpp/X11/Xamples/dt/appconfig/types/zh_CN
/usr/lpp/X11/custom/dt/appconfig/appmanager/zh_CN
/usr/lpp/X11/custom/dt/appconfig/types/zh_CN
/usr/lpp/X11/custom/lib/zh_CN
/usr/lpp/X11/defaults/Motif1.2/zh_CN
/usr/lpp/X11/defaults/xmodmap/zh_CN
/usr/lpp/X11/lib/X11/zh_CN
/usr/lpp/save.config/usr/lpp/X11/custom/dt/appconfig/appmanager/zh_CN
/usr/lpp/save.config/usr/lpp/X11/custom/dt/appconfig/types/zh_CN
/usr/lpp/save.config/usr/lpp/X11/custom/lib/zh_CN
/usr/lpp/save.config/usr/lpp/X11/defaults/Motif1.2/zh_CN
/usr/lpp/save.config/usr/lpp/X11/lib/X11/zh_CN
/usr/swlag/zh_CN
/usr/tivoli/guid/zh_CN
/usr/vac/doc/zh_CN
/usr/vac/man/zh_CN
/usr/vacpp/doc/zh_CN
/usr/vacpp/man/zh_CN The locale name dependency for the new locale name is topologized and presented to the user. The topology of locale name dependencies is a graphical representation of the dependency of one version of the locale name to another. If a locale name has been split into multiple dependent locale names, e.g., Czechoslovakia into the Czech Republic and Slovakia, these dependencies may be identified in this topology representation. The topology representation may take many forms including, but not limited to, a linked list representation, a tree representation, or the like. From this topology representation, the user is informed of the various previous versions of the locale name that will be replaced by the new locale name when replacing the selected locale name(s) selected by the user via the locale name management user interface.

A set of testcases for testing the operation of an operating system, application, and/or the like, may be established which tests the input/output of these software mechanisms with regard to locale based operations. For example, these testcases may test the time/date format input/output of an application, the monetary format of input/output of an application, language input/output, keyboard input, system message catalog output, desktop configuration operations, or any other locale name and locale object based operation. Such testcases may have been generated for a previous version of the locale name or may be newly developed. In either case, the testcases may be updated to utilize the new locale name for the old locale name(s) to be replaced. Thus, the old locale name instances in the testcases may be replaced with the new locale name to thereby update the testcases. The old testcases may be retained for later use should the new locale name not pass verification using the updated testcases.

Mapping data structures are generated/updated to map the new locale name to the old locale names) selected for replacement. This mapping data structure may map existing locale objects to the new locale name, map a corresponding keyboard object of the old locale name to the new locale name, map an input method object of the old locale name to the new locale name, and the like. User profiles, system profiles, and application profiles may be updated accordingly to utilize the new locale name. Of course old versions of each of these profile data structures are maintained for use in restoring the old locale name should the new locale name mapping not pass verification.

It should be appreciated that, in one illustrative embodiment, the mapping of the new locale name may also comprise generating new local objects, rather than using the existing locale objects, which are then mapped to the new locale name. In such a case, the new locale objects may be a copy of the existing locale object with any necessary updates. In this way, the existing locale objects are preserved for rollback purposes should that become necessary. The user may be provided with an option, such as through a graphical user interface, to choose whether to generate new local objects or use existing locale objects.

Once these data structures are mapped and updated, they are subjected to the updated testcases to test the use of the mapping and updated profiles by the application(s) and operating system in performing the operations tested by the testcases. A determination is made as to whether the new mappings and profile data structures pass the verification testing of the testcases. If so, the updates are committed to the user profiles, system profiles, and application profiles. If the verification does not pass, then the changes made to the profiles, the testcases, and the mapping data structures is rolled back and the old locale name that was replaced by the new locale name is restored.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
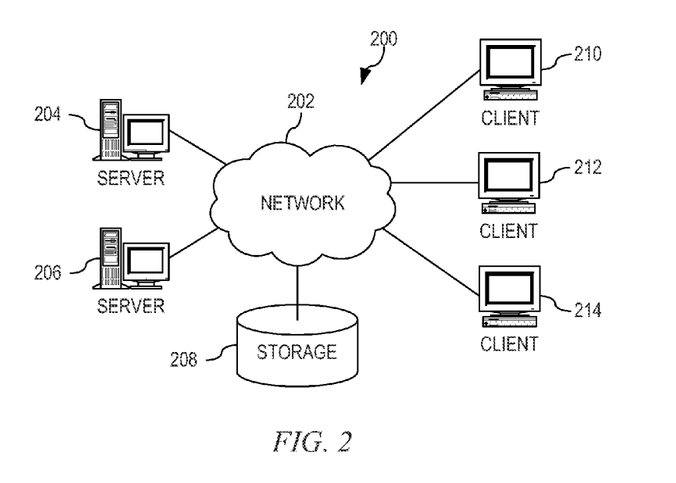
FIG. 2 is an example diagram of a distributed data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

Figure 3:
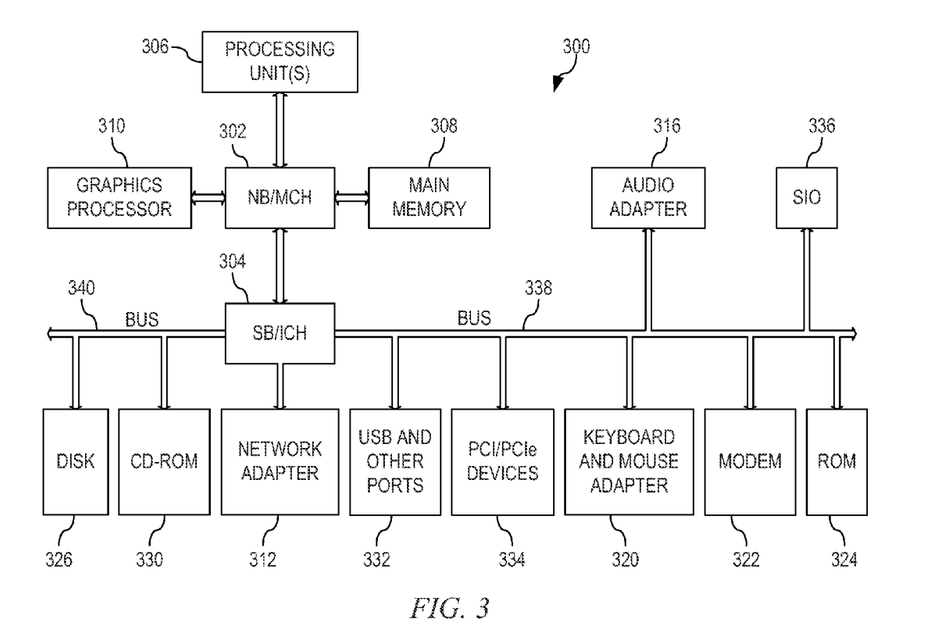
FIG. 3 is an example block diagram of a computing device in which aspects of the illustrative embodiments may be implemented.

FIG. 3 is a block diagram of an example data processing system in which aspects of the illustrative embodiments may be implemented. Data processing system 300 is an example of a computer, such as server 204 or 206 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (510) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System P® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Referring again to FIG. 2, one or more of the servers 204, 206 may host a locale name configuration engine that implements a locale name management user interface in accordance with one or more illustrative embodiments described herein. A user of a client computing device, such as client 210, may access the locale name configuration engine via the locale name management user interface to perform locale name management operations, such as modifying a locale name and determining the effects of the modification to the locale name as well as generating mapping structures for implementing the locale name modifications in a distributed data processing system 200, which may be multicultural and/or globalized. The locale name modifications may be submitted, tested, and committed via the locale name configuration engine. The committing of the change in a locale name may comprise invoking coherency mechanisms for distributing the change to all of the computing devices of the distributed data processing system 200. Alternatively, the change may be maintained in a centralized server with client computing devices 210-214 performing locale based operations via the centralized server and the centralized locale name data structures, including the locale name mapping data structures.

Figure 4:
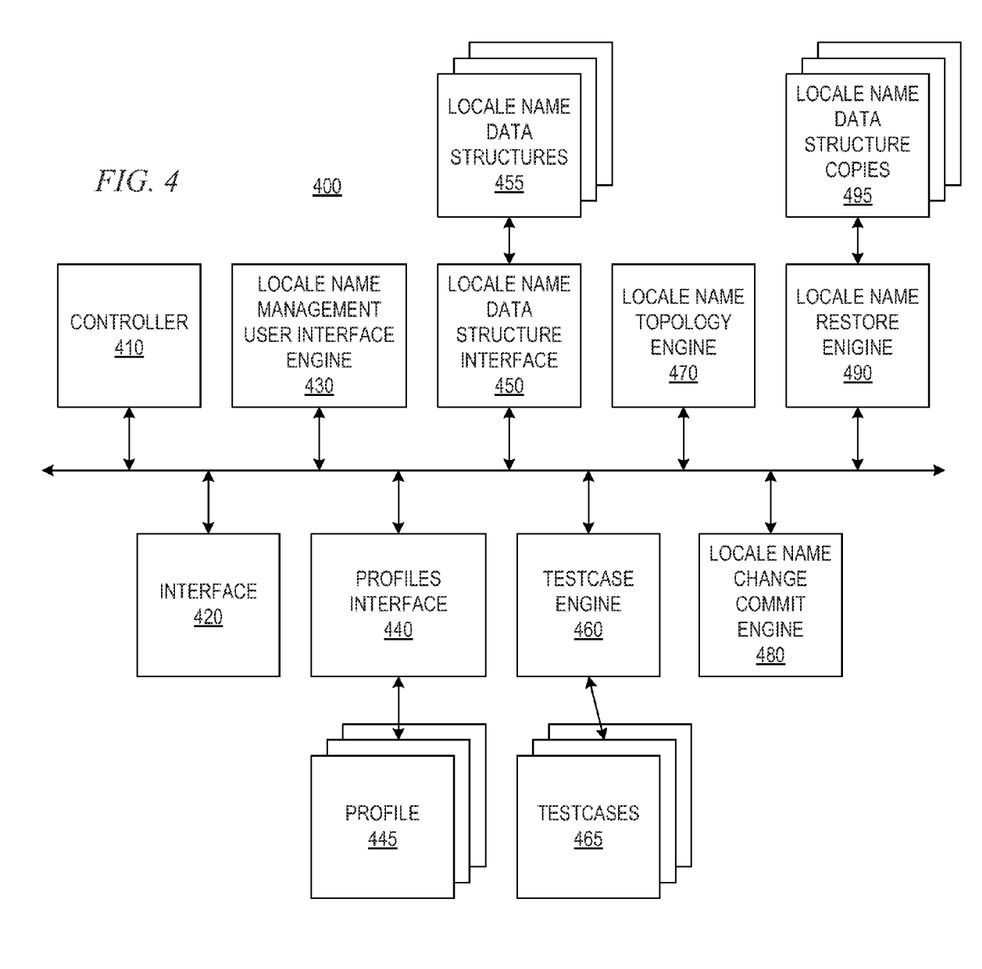
FIG. 4 is an example block diagram of the primary operational elements of a locale name configuration engine in accordance with one illustrative embodiment.

FIG. 4 is an example block diagram of the primary operational elements of a locale name configuration engine in accordance with one illustrative embodiment. The elements shown in FIG. 4 may be implemented in software executed by one or more processors of one or more computing devices, hardware, or a combination of software and hardware. In one illustrative embodiment, the elements 410-490 of the locale name configuration engine 400 are implemented as software instructions loaded into one or more memories and executed by one or more processors of one or more computing devices.

As shown in FIG. 4, the locale name configuration engine 400 comprises a controller 410, a data communications interface 420, a locale name management user interface engine 430, a profiles interface 440, a locale name data structure interface 450, a testcase engine 460, a locale name topology engine 470, a locale name change commitment engine 480, and a locale name restore engine 490. The controller 410 controls the overall operation of the locale name configuration engine 400 and orchestrates the operation of the other elements 420-490. The data communications interface 420 provides a data communication pathway through which data and control messages may be transmitted and received to/from other computing devices of a distributed data processing system. For example, user input to a locale name management user interface may be received via the data communications interface 420 and outputs of processing of data performed by the locale name configuration engine 400 may be output via a locale name management user interface output via the data communications interface 420.

The locale name management user interface engine 430 provides logic for generating and outputting a locale name management user interface, presenting output of processing by the locale name configuration engine 400 via the locale name management user interface, and receiving/processing user input to the locale name management user interface. The locale name management user interface provides fields for receiving user input regarding a new locale name to be utilized, optionally a field for entry of one or more attributes associated with the new locale name that may be used to automatically identify old locale names that may be replaced by the new locale name, fields for outputting a listing of old locale names that may be replaced, a portion for output of a locale name topology associated with the new locale name and the old locale name(s) being replaced, results of testcase execution, and the like. An example of a locale name management user interface will be described in greater detail with regard to FIG. 5 described hereafter.

The profiles interface 440 provides logic for accessing, searching, and updating various levels of profiles 445 including user profiles, system profiles, and application profiles. Via the profiles interface 440, the profiles 445 may be searched to identify locale names used by the profiles 445 that are related to a new locale name and, when determining that commitment of the new locale name change is to be made, updating the profiles 445 with the new locale name information.

With regard to the profiles 445 themselves, there are multiple local definition layers in which profiles 445 are provided and used to serve the operating system, applications, and different users. For example, operating systems have a primary profile to define a primary locale with default language and related culture conventions. Any application in the operating system platform will use the operating system primary locale settings unless another locale is user specified. In AIX®, for example, a file /etc/environment defines the primary operating system locale in the following manner:

```
...
PATH=/usr/bin:/etc:/usr/sbin:/usr/ucb:/usr/bin/X11:/sbin:/usr/java5/jre/bin:/usr/ja
va5/bin
TZ=CST6CDT
LANG=en_US
LOCPATH=/usr/lib/nls/loc
NLSPATH=/usr/lib/nls/msg/%L/%N:/usr/lib/nls/msg/%L/%N.cat
...
```

From the above, one can see the global variable "LANG" has been defined as "en_US" locale (English United States). System applications and command prompts will use "en_US" as the default locale setting and output information (such as help, warning, alert, date, calendar, phone number, currency) in English and US convention. If a user changes the LANG to ja_JP in /etc/environment file, the operating system locale will be changed to Japanese.

Each application may also define their own locale. For instance, a user can define a webserver specifically for Chinese users as zh_Hans_CN.UTF-8 in a webserver profile even if the server operating system primary locale is defined as "en_US". In addition, application also can have pre-installed multilingual packages with different locale settings. For example, in Microsoft Windows™, there are a large number of predefined and preinstalled locale profiles for different Chinese users:

```
./cygwin/usr/share/locale/zh_CN
./cygwin/usr/share/vim/vim73/lang/zh_CN
./cygwin/usr/share/X11/locale/zh_CN
./cygwin_old/usr/i686-pc-mingw32/sys-
root/mingw/share/locale/zh_CN
./cygwin_old/usr/share/locale/zh_CN
./cygwin_old/usr/share/lyx/doc/zh_CN
./cygwin_old/usr/share/vim/vim73/lang/zh_CN
./cygwin_old/usr/share/X11/locale/zh_CN
./notes/framework/rcp/eclipse/features/com.ibm.rcp.personality.default
.feature_6.2.3.20110915-1350/nl/zh_CN
./notes/framework/rcp/eclipse/features/com.ibm.rcp.portletcontainer.fe
ature_6.2.3.20110915-1350/nl/zh_CN
./notes/framework/shared/eclipse/features/com.ibm.rcp.site.anchor.shar
```

-continued

```
ed.feature__6.1.1/nl/zh__CN
./Program Files/Adobe/Acrobat 7.0/Acrobat/Legal/Adobe
Acrobat/7.0.0/zh__CN
./Program Files/Adobe/Adobe Bridge/Legal/zh__CN
./Program Files/Adobe/Adobe Photoshop CS2/Activation/zh__CN
./Program
Files/IBM/Lotus/Symphony/framework/rcp/eclipse/features/com.ibm.r
cp.personality.default.feature__6.2.3.20110915-1350/nl/zh__CN
./Program
Files/IBM/Lotus/Symphony/framework/rcp/eclipse/features/com.ibm.r
cp.portletcontainer.feature__6.2.3.20110915-1350/nl/zh__CN
./Program Files/IBM/WebSphere MQ/Tools/Java/jms/applet/zh__CN
...
```

In the above example, one can see how complicated locale name usage in Microsoft Window™ actually is, which is illustrative of the difficulty to change a locale name on the fly.

As an end of user, each user also can have their own locale setting in his/her home directory (e.g. /home/USER-NAME/.profile). Therefore the user can launch private sessions from his/her own customized locale environment.

The locale name data structure interface 450 provides a data communication pathway for accessing, searching, and updating locale name data structures 455 used for maintaining information about locale names supported by the computing device, distributed data processing system, or the like, in which the locale names are utilized. The locale name data structures 455 may comprise locale name objects, locale name mapping data structures, a locale name history data structure, and the like. The local name objects may be binary or plaint text files used for loading of locale data for customizing the operations of operating systems, applications, and the like, to the locale preferred by the user. The locale name mapping data structure may comprise information for mapping one locale name to another, such as an earlier version of the locale name, as well as mapping the locale name, or set of related locale names, to a corresponding locale name object. The locale name mapping data structure may provide a linking between previous locale name objects and a current locale name object such that a topology of locale names may be identified. The locale name mapping data structure may alternatively store only the mapping of the new locale name to the previously used, or replaced, locale name. In such a case, the locale name history data structure may store a history of locale names and their relationships as one version of a locale name is replaced with a next locale name.

The testcase engine 460 provides logic for building/updating testcases 465 based on new locale names submitted via the locale name management user interface, applying the testcases to test the implementation of the new locale name with regard to the applications, operating system, and the like (e.g., a software system), and determining if the application of the testcases result in the new locale name passing or failing the testcases, e.g., an error occurs due to the use of the new locale name or not. Preferably, the testcases specifically invoke operations of the operating system, application, or the like, that utilize locale customization, e.g., generate output in a locale specific language, generate monetary or time/date information in a locale specific manner, or the like.

The locale name topology engine 470 generates a locale name topology based on information obtained from the locale name data structures 455 to present a topology that identifies related locale names and the historical progression of locale names from one version to another. This topology may be presented to a user via the locale name management user interface generated by the locale name management user interface engine 430 discussed above. For example, from the locale name mapping information in the locale name mapping data structure, or the locale name history information in the locale name history data structure, or both, a parent child relationship between locale names may be identified such that older locale names are represented as parents of newer locale names which are represented as children of the parent locale names. A multi-level topology of such locale names may thus be generated based on these parent-child relationships. The topology may then be output as a linked list, tree structure, or other relational structure.

The locale name change commitment engine 480 provides logic for performing operations for committing updates to data structures to implement the new locale name in response to the testcases indicating that the new locale name passes the testcases. The locale name change commitment engine 480 performs operations for updating user profiles, system profiles, and application profiles to utilize the new locale name. The locale name change commitment engine 480 further performs operations to commit the locale name mapping in the locale name mapping data structure to map the new locale name to the one or more previous or old locale names to be replaced by the new locale name.

The locale name restore engine 490 provides logic for rolling back or restoring changes to a locale name in the event that the new locale name does not pass the testcases. The locale name restore engine 490 may maintain restore copies 495 of data structures prior to updating locale names with the new locale name. That is, the locale name restore engine 490 may store copies of the user profile(s), system profile(s), application profile(s), mapping data structure, history data structure, locale name objects, or the like, so that they may be restored in the event that the new locale name does not pass the testcases. The locale name restore engine 490 may restore or replace the updated data structures with the old versions or copies of the data structures prior to the update with the new locale name in the event of a failure of the new locale name to pass one or more of the testcases.

Figure 5:
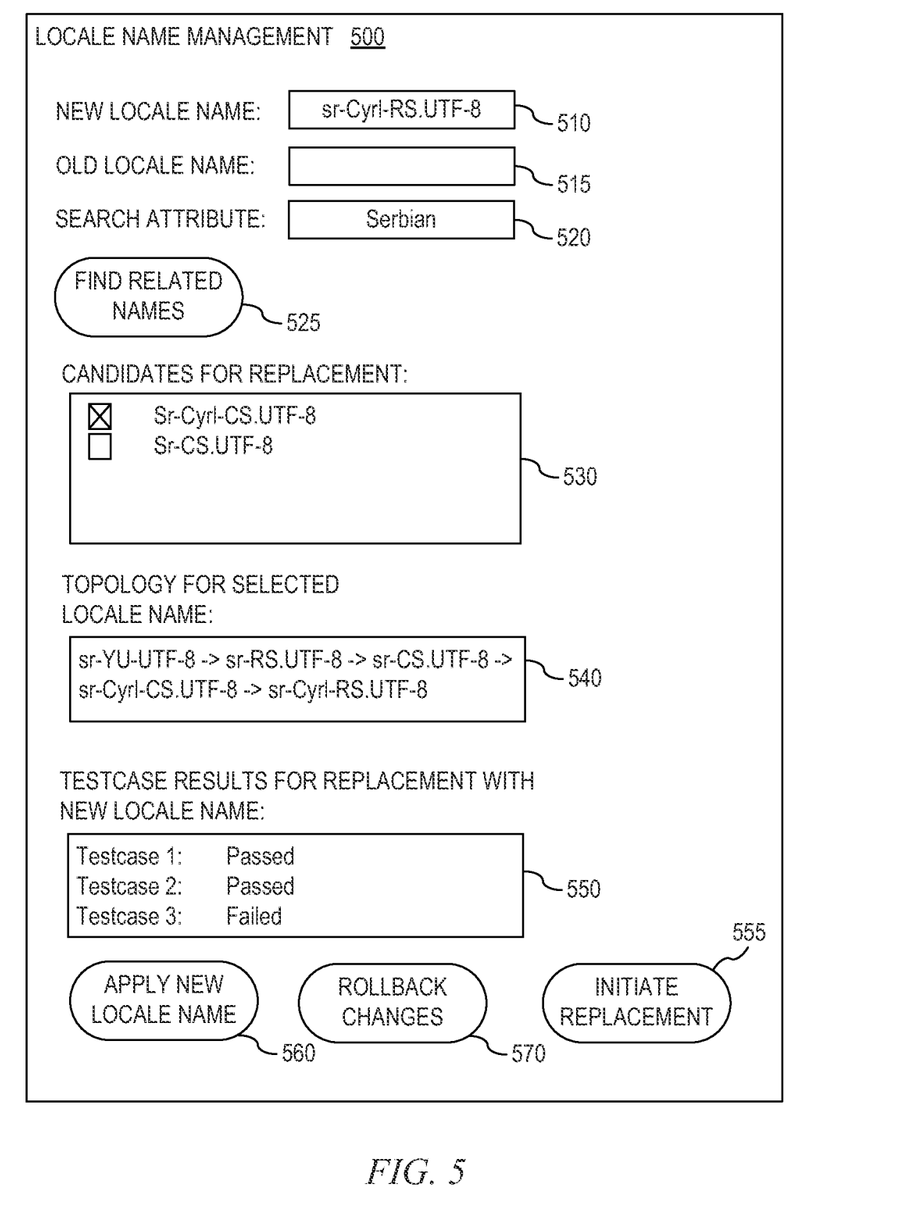
FIG. 5 is an example diagram of a locale name management user interface in accordance with one illustrative embodiment.

FIG. 5 is an example diagram of a locale name management user interface in accordance with one illustrative embodiment. As shown in FIG. 5, the locale name management user interface 500 comprises a field 510 for entering a new locale name for deployment into a data processing system and optionally a field 515 for inputting a current or "old" locale name to be replaced. A field 520 may optionally be provided for specifying one or more attributes, such as a geographical region name, of the new locale name that may be used to automatically identify other locale names related to the new locale name. If field 515 is left empty, the empty field may be an indicator to the mechanisms of the illustrative embodiment to implement an automatic identification of candidate locale names for replacement using the attributes specified in field 520. A graphical user interface (GUI) element 525 may be provided for user selection to automatically identify related candidate locale names for replacement using the attributes specified in field 520.

A portion 530 is provided for outputting a listing of currently used locale names related to the new locale name specified in field 510. This portion 530 may be populated with the identified locale name to be replaced specifically input in field 510 or one or more related locale names that can be replaced with the new locale name that may have been automatically identified by the mechanisms of the illustrative embodiment by finding locale names with similar attributes in the locale names currently being utilized in the data processing system. These locale names currently being utilized may be identified from various profiles or other data structures used for locale based customization in the data processing system and searching these data structures/profiles for locale names having similar attributes to those of the new locale name.

A user may select one or more locale names in the related locale name portion 530 for replacement by the new locale name entered in field 510. The locale name management user interface 500 may further comprise a portion 540 for outputting a topology of the new locale name based on the selected locale name(s) to be replaced as selected in portion 530, in response to the selection of these locale name(s). The topology represented in portion 540 may be generated by locale name relationships identified in one or more locale name data structures, e.g., locale name history data structures, locale name mapping data structures, and/or the like.

The locale name management user interface 500 further comprises a portion 550 for outputting results of the application of one or more testcases to test the use of the new locale name specified in field 510. The output in field 510 may specify which testcases passed and which failed, if any. A final determination of pass or fail may further be indicated.

A GUI element 555 may be provided to initiate the replacement of the selected one or more locale names with the new locale name entered in field 510. The contents of portion 550 may be updated or generated in response to selection of the GUI element 555. While this causes the replacement to occur and the testcases to be run, the replacement is not yet committed and is still able to be rolled back. Thus, in addition, user interface elements 560 and 570 may be provided for either committing or rolling back the changes to implement the new locale name based on the results of the testcases.

Figure 6:
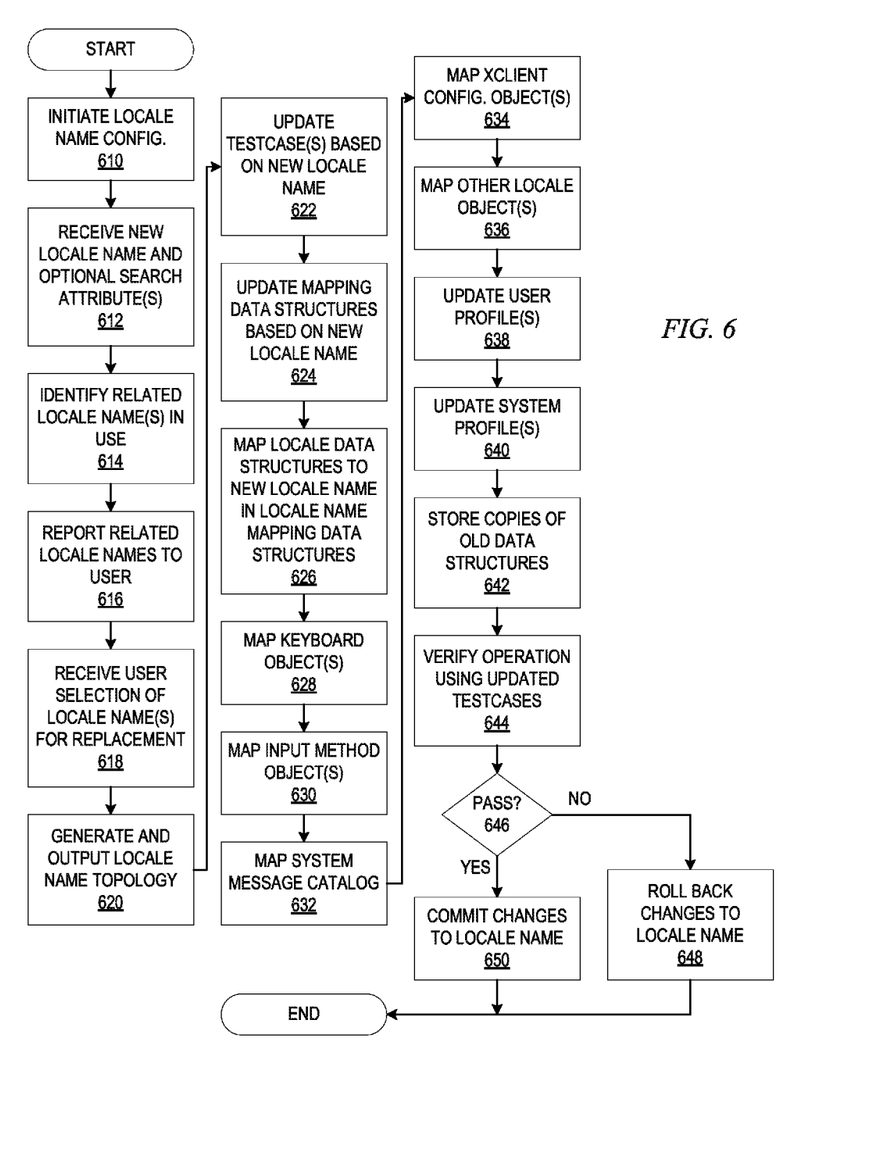
FIG. 6 is a flowchart outlining an example operation for performing a locale name change operation in accordance with one illustrative embodiment.

FIG. 6 is a flowchart outlining an example operation for performing a locale name change operation in accordance with one illustrative embodiment. As shown in FIG. 6, the operation starts with the user initiating a locale name configuration operation via the locale name configuration engine (step 610). The user inputs, via the locale name management user interface provided by the locale name configuration engine, a new locale name, optionally an old locale name to be replaced, or one or more attributes of the new locale name for use in finding related locale names (step 612). A search of related locale names from profile data structures, and/or other locale name based data structures, is performed based on attributes associated with the new locale name to identify old locale names that may be replaced with the new locale name (step 614). The related locale names are then reported to the user via the locale name management user interface (step 616). In addition, independent software vendor (ISV) applications utilizing locale names may be identified and presented to the user with an indication that the user may need to manually reconfigure these ISV applications to utilize the new locale name.

A user selection of a locale name to be replaced by the new locale name is received in the locale name management user interface (step 618). Based on the selection of the locale name to be replaced and the identification of the new locale name that is to replace it, a topology of the new locale name and its predecessor related locale names is generated and output (step 620). In addition, one or more testcases for testing the operation of the operating system/application with regard to the a locale name is updated to use the new locale name (step 622). Mapping data structures and the like are updated to replace the selected old locale name with the new locale name (step 624).

Various locale name data structures corresponding to the locale name to be replaced are then mapped to the new locale name in one or more locale name mapping data structures, including the locale name object (step 626), any keyboard objects (step 628), an input method object (step 630), a system message catalog (step 632), any XCLIENT configuration objects (step 634), and other locale name based objects or data structures (step 636). The user profile(s) are updated (step 638) and system profile(s) are updated (step 640) with the new locale name information, and copies of the old profiles, data structures and objects are stored for later use in restoring or rolling back changes should that become necessary (step 642).

Thereafter, the testcases are used to verify that the operating system and/or applications operate properly using the new locale name (step 644). A determination is made as to whether the new locale name passes the tests implemented by the testcases (step 646). If not, the change to the locale name is rolled back and old versions of the data structures, objects, and the like, are restored using the copies stored in step 642 (step 648). If the testcases are passed, then the change to the locale name is committed (step 650) and the operation terminates.

Thus, the illustrative embodiments provide mechanisms for managing system locale names so as to keep globalization support coherence. The illustrative embodiments provide a locale name management user interface through which a user may initiate, commit, or roll back a change to a locale name as well as test the implementation of the change to the locale name and obtain information regarding the impact of the locale name change on a distributed data processing system, which may be a multi-cultural or globalized data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for performing a locale name modification operation, the method comprising:
   receiving, in the data processing system, via a locale name management user interface presented by the data processing system, a new locale name to be used by the data processing system to perform locale customized operations;
   identifying, by the data processing system, an existing locale name to be replaced by the new locale name;
   mapping, by the data processing system, the new locale name to existing locale name data structures associated with the existing locale name to be replaced;
   verifying, by the data processing system, proper operation of a software element using the new locale name and the mapping of the new locale name to the existing locale name data structures; and
   utilizing, by the data processing system, the new locale name to perform locale name customized operations in response to verifying proper operation of the software element, wherein the new locale name and the existing locale name are designators of a similar locale, and wherein a locale represents a set of rules and parameters of cultural conventions to be used by at least one of operating systems or applications when performing the locale customized operations on the data processing system.

2. The method of claim 1, wherein identifying an existing locale name to be replaced by the new locale name comprises receiving a user input into the locale name management user interface indicating the existing locale name to be replaced by the new locale name.

3. The method of claim 1, wherein identifying an existing locale name to be replaced by the new locale name comprises performing an automatic search for installed locale names that are candidates for replacement by the new locale name.

4. The method of claim 3, wherein the automatic search for installed locale names is performed based upon one or more attributes of existing locale names specified by a user input to the locale name management user interface.

5. The method of claim 1, further comprising:
   outputting, via the locale name management user interface, a topology of locale dependency relations based on the new locale name, wherein the topology identifies related locale names and a historical progression of locale names from one version to another.

6. The method of claim 5, wherein the topology of locale dependency relations is generated based on a history data structure that identifies a history of progression of locale names from one version to another.

7. The method of claim 1, wherein verifying proper operation of a software element using the new locale name and the mapping of the new locale name to the existing locale name data structures comprises updating or generating one or more local name testcases and applying the one or more testcases to a software system of the data processing system.

8. The method of claim 7, further comprising:
   outputting results of the application of the one or more testcases via a user interface, wherein the results include an indication of whether the one or more testcases passed or failed; and
   receiving a user input to the user interface, based on the results of the one or more testcases, selecting whether to commit or rollback the mapping of the new locale name.

9. The method of claim 1, further comprising:
   storing a restore copy of the existing locale name data structures prior to mapping the new locale name to the existing locale name data structures; and
   in response to receiving a user input selecting to rollback the mapping of the new locale name to the existing locale name data structures, restoring the existing locale name data structures using the restore copy of the existing locale name data structures.

10. The method of claim 1, wherein the existing locale name data structures comprise at least one of a user profile, a system profile, or an application profile.

* * * * *